United States Patent
Xie et al.

(10) Patent No.: US 12,292,377 B2
(45) Date of Patent: May 6, 2025

(54) MULTI-WAVEBAND-TUNABLE MULTI-SCALE META-MATERIAL AND PREPARATION METHOD AND SPECTRAL DETECTION METHOD THEREOF

(71) Applicant: ZHEJIANG UNIVERSITY, Hangzhou (CN)

(72) Inventors: Lijuan Xie, Hangzhou (CN); Yingli Wang, Hangzhou (CN); Yibin Ying, Hangzhou (CN); Xiangjiang Liu, Hangzhou (CN); Lin Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 19 days.

(21) Appl. No.: 18/034,105

(22) PCT Filed: Sep. 8, 2021

(86) PCT No.: PCT/CN2021/117103
§ 371 (c)(1),
(2) Date: Apr. 27, 2023

(87) PCT Pub. No.: WO2022/267228
PCT Pub. Date: Dec. 29, 2022

(65) Prior Publication Data
US 2023/0393063 A1    Dec. 7, 2023

(30) Foreign Application Priority Data

Jun. 24, 2021    (CN) .......................... 202110704566.2

(51) Int. Cl.
*G01N 21/3581*    (2014.01)
*G01N 21/65*    (2006.01)

(52) U.S. Cl.
CPC ......... *G01N 21/3581* (2013.01); *G01N 21/65* (2013.01)

(58) Field of Classification Search
CPC .. G01N 21/3581; G01N 21/65; G01N 21/554; G01N 21/3586
See application file for complete search history.

(56) References Cited

U.S. PATENT DOCUMENTS

| 2012/0154793 A1* | 6/2012 | Pryce | G01N 21/3581 356/128 |
| 2013/0293884 A1* | 11/2013 | Lee | B05D 3/10 428/206 |
| 2017/0259610 A1* | 9/2017 | Cheng | B42D 25/378 |

FOREIGN PATENT DOCUMENTS

| CN | 207587978 U | 7/2018 |
| CN | 109060762 A | 12/2018 |

(Continued)

OTHER PUBLICATIONS

Gao et al., SERS substrate based on the flexible hybrid of polydimethylsiloxane and silver colloid decorated with silver nanoparticles, Optics Express 21784, vol. 26, No. 17, Aug. 20, 2018. (Year: 2018).*

*Primary Examiner* — David P Porta
*Assistant Examiner* — Casey Bryant
(74) *Attorney, Agent, or Firm* — Bayramoglu Law Offices LLC

(57) ABSTRACT

A multi-waveband-tunable multi-scale meta-material and a preparation method and a spectral detection method thereof are provided. The meta-material includes a stretchable layer, a non-stretchable support layer, a metal layer, and a nanoparticle layer sequentially stacked from bottom to top. The stretchable layer is a polydimethylsiloxane (PDMS) layer. The non-stretchable support layer is a polyimide (PI) layer. The metal layer is a gold layer. The nanoparticle layer is (Continued)

modified with a hydrophobic group. The preparation method includes vacuum-evaporating fluorosilane on a silicon wafer, spin-coating PDMS, heat-curing PDMS, conducting plasma cleaning, spin-coating and curing PI, sputtering gold, self-assembling the nanoparticles on a water surface to form the nanoparticle layer, transferring the nanoparticle layer to the metal layer, and etching according to a pattern. The multi-waveband-tunable multi-scale meta-material can sense biochemical molecules by utilizing the advantages of multiple wavebands, is simple and fast to operate, and is suitable for various detection needs.

9 Claims, 6 Drawing Sheets

(56) References Cited

FOREIGN PATENT DOCUMENTS

| | | |
|---|---|---|
| CN | 110132881 A | 8/2019 |
| CN | 112763475 A | 5/2021 |

* cited by examiner

MULTI-WAVEBAND-TUNABLE MULTI-SCALE META-MATERIAL AND PREPARATION METHOD AND SPECTRAL DETECTION METHOD THEREOF

CROSS REFERENCE TO THE RELATED APPLICATIONS

This application is the national phase entry of International Application No. PCT/CN2021/117103, filed on Sep. 8, 2021, which is based upon and claims priority to Chinese Patent Application No. 202110704566.2, filed on Jun. 24, 2021, the entire contents of which are incorporated herein by reference.

TECHNICAL FIELD

The present disclosure relates to a meta-material and a preparation method and a detection method thereof. In particular, the present disclosure relates to a preparation method of a multi-scale meta-material and a method for comprehensively detecting a sample in different wavebands by using the multi-scale meta-material.

BACKGROUND

Spectroscopy technology has always been the focus of research due to its fast detection speed and non-destructiveness. As an important means to identify the structure of substances, spectroscopy technology has a wide range of applications in life science, food science, material science, archaeology, agriculture, etc. The ultraviolet-visible (UV-Vis) absorption spectrum is produced due to the transition of valence electrons. The composition, content, and structure of the substance can be analyzed, measured, and inferred through the UV-Vis spectrum and the degree of absorption of UV-Vis light by molecules or ions of the substance. The infrared (IR) spectrum is produced by the transition of vibrational and rotational energy levels in molecules due to the selective absorption of IR rays of certain wavelengths by the molecules. The IR absorption spectrum of the substance is also known as a vibrational spectrum or vibrational rotational spectrum, which can be acquired by detecting the absorption of IR rays. Additional information about the sample can be acquired by detecting the sample through multiple spectral detection techniques. However, most of the currently used meta-materials in sample detection only apply to a single waveband and cannot achieve responses in multiple wavebands. In addition, in practical detection applications, the surface of the detected sample is usually curved, so it is necessary to realize the close contact between the detected sample surface and the sensor surface.

SUMMARY

A technical problem to be solved by the present disclosure is to provide a multi-scale meta-material and a multi-waveband photoelectric device to overcome the above-mentioned deficiencies of the related art. The photoelectric device applies to different wavebands, for example, a first waveband (such as UV waveband and Vis waveband) and a second waveband (such as IR waveband, terahertz waveband, and microwave waveband). The photoelectric device can perform biochemical molecular sensing in the Vis waveband and the terahertz waveband and is flexible, stretchable, sensitive, fast, and convenient as a detection device.

The multi-scale meta-material of the present disclosure has a tunable function in multiple wavebands, can sense biochemical molecules by utilizing the advantages of multiple wavebands, is simple and fast to operate, and is suitable for various detection needs.

The present disclosure adopts the following technical solutions 1. A multi-waveband-tunable multi-scale meta-material includes:
  a stretchable layer, a non-stretchable support layer, a metal layer, and a nanoparticle layer that are sequentially stacked from bottom to top. The stretchable layer is a polydimethylsiloxane (PDMS) layer. The non-stretchable support layer is a polyimide (PI) layer. The metal layer is a gold layer. The nanoparticle layer is modified with a hydrophobic group.

In the present disclosure, nanoparticles are self-assembled on the metal layer to form the nanoparticle layer. The structure can simultaneously absorb and reflect in the first waveband (such as UV waveband and Vis waveband) and the second waveband (such as IR waveband, terahertz waveband, and microwave waveband) to amplify a Raman signal in the first waveband and a terahertz signal in the second waveband.

The stretchable layer is provided thereon with multiple basic units that are arranged in an array at intervals. The basic units each include the non-stretchable support layer, the metal layer, and the nanoparticle layer which are sequentially stacked from bottom to top.

The PI that forms the non-stretchable support layer is a flexible low-stretch film. The present disclosure uses the PI as the non-stretchable support layer to protect the integrity of the metal layer and the nanoparticle layer. When the PDMS layer is stretched, a part not covered with the PI will be deformed, and a part covered with the PI will not be easily deformed.

2. A preparation method for the multi-waveband-tunable multi-scale meta-material includes the following steps:
  1) preparation of the stretchable layer:
  vacuum-evaporating a layer of fluorosilane on a surface of a cleaned silicon wafer and spin-coating and heat-curing a layer of PDMS to form the stretchable layer;
  2) preparation of the non-stretchable support layer:
  subjecting the heat-cured PDMS to plasma cleaning, spin-coating a layer of PT, and curing the PI at 200° C. for 2 h to form the non-stretchable support layer;
  3) preparation of the metal layer:
  sputtering gold with a thickness of 200 nm on the surface of the PI to form the metal layer;
  4) preparation of the nanoparticle layer:
  modifying nanoparticles with the hydrophobic group, self-assembling the nanoparticles modified with the hydrophobic group on a water surface to form the nanoparticle layer, and transferring the nanoparticle layer to the metal layer to form the nanoparticle layer; and
  5) etching of a preset pattern:
  etching the non-stretchable support layer, the metal layer, and the nanoparticle layer according to the preset pattern and removing the stretchable layer from the silicon wafer and the fluorosilane.

The nanoparticle layer is formed by self-assembling 10 nm-80 nm silver-coated gold nanoparticles on the water surface. Therefore, the nanoparticle layer is formed by self-assembling gold or silver nanoparticles.

The metal layer is formed by sputtering or evaporating a material, which includes, but is not limited to, gold, silver, copper, iron, and nickel.

The etching technique includes, but is not limited to, photolithography, X-ray etching, electron beam etching, ion beam etching, wet etching, and laser engraving.

The PDMS of the stretchable layer has a thickness of 10 μm-200 μm, and the PI of the non-stretchable support layer has a thickness of 1 μm-10 μm.

A localized surface plasmon resonance spectrum of the first waveband is tuned by changing the material, morphology, and size of the nanoparticles, and a resonance peak of the second waveband is tuned by adjusting the preset pattern.

The preset pattern is formed by multiple basic units that are arranged in an array at intervals, and the basic units each include the non-stretchable support layer, the metal layer, and the nanoparticle layer that are sequentially stacked from bottom to top.

The multi-waveband-tunable multi-scale meta-material is used for, but is not limited to, dual-waveband spectral response and can also be used for spectral responses of more than two wavebands. More scales can be achieved by designing the shape of the gold layer to form different patterns. Spectral responses of other wavebands can be achieved by changing the pattern of the gold layer.

The multi-waveband-tunable multi-scale meta-material includes at least two scales: nanoscale, (i.e., the scale of nanoparticles) and microscale (i.e., the scale of the basic units).

The multi-waveband-tunable multi-scale meta-material is not limited to these two scales and also includes millimeter and meter scales, etc.

3. A spectral detection method using the multi-waveband-tunable multi-scale meta-material includes the following steps:

S1: dripping a sample solution onto the multi-waveband-tunable multi-scale meta-material:
  preparing and dripping the sample solution onto the multi-waveband-tunable multi-scale meta-material; specifically, dripping the sample solution onto the nanoparticle layer and conducting drying at 50° C. to form a sample to be detected; and taking the multi-waveband-tunable multi-scale meta-material that is not dripped with the sample solution as a reference sample;

S2: performing terahertz spectral detection in a second waveband:
  acquiring terahertz time-domain signals of the sample to be detected and the reference sample at a humidity of less than 0.2 RH separately; calculating terahertz frequency-domain signals based on the terahertz time-domain signals; determining locations of resonance peaks based on the terahertz frequency-domain signals; and taking a difference between a frequency of the resonance peak of the sample to be detected and a frequency of the resonance peak of the reference sample as a detection signal, thereby realizing amplification of a sample signal corresponding to the sample solution;

S3: performing Raman spectral detection in a first waveband:
  putting the sample to be detected on a sample stage of a Raman spectrometer; focusing, by a confocal microscope, the sample to be detected; and randomly selecting three points in a detection range of 400 $cm^{-1}$-1,800 $cm^{-1}$ for Raman spectral detection.

In S1, 10 μL of the sample solution is dripped each time, and the drying is performed at 40° C.-60° C.

In S2, a time-domain signal is at a range of 25 ps, and the frequency-domain signal is at a position of 0.1 THz-1.3 THz.

The sample solution includes, but is not limited to, *Pseudomonas aeruginosa* and pyocyanine. The *Pseudomonas aeruginosa* is detected by the Raman spectra, and the pyocyanine is detected by the terahertz spectra.

Preferably, in a specific implementation, the PDMS solution of the present disclosure is, but is not limited to, a DC184 PDMS solution produced by Dow Corning.

Preferably, in a specific implementation, the fluorosilane may be, but is not limited to, 448931-10G trichloro(1H,1H, 2H,2H-perfluorooctyl)silane produced by Sigma.

The PI film of the present disclosure may be replaced with a photoresist, such as SU-8.

Preferably, in a specific implementation, the terahertz time-domain spectroscopy system of the present disclosure is one of model z3 produced by z-omega.

Preferably, in a specific implementation, the Raman spectrometer of the present disclosure is one of the models of the LABRAM HR Evolution produced by the Jobin Yvon HORIBA group.

The multi-waveband-tunable multi-scale meta-material of the present disclosure includes the nanoparticle layer, the metal layer, the non-stretchable support layer, and the stretchable layer. The nanoparticle layer has strong spectral absorption capability in the first waveband (such as UV waveband and Vis waveband), thereby acquiring a localized surface plasmon resonance spectrum and forming an electric field that can amplify the Raman signal on its surface. The metal layer can excite the corresponding resonance peak in the second waveband (such as the IR waveband, the terahertz waveband, and the microwave waveband) through the surface plasmon resonance effect to enhance the interaction between the terahertz wave and the substance, thereby improving the terahertz detection sensitivity. An ordinary meta-material can only act on the spectrum of a certain waveband, so the detection result is single. The outstanding advantage of the present disclosure is that the multi-waveband-tunable multi-scale meta-material can be used for spectral detection of different wavebands and can also be closely attached to the curved surfaces to adapt to different detection objects.

In the present disclosure, in steps S2 and S3, the meta-material is simultaneously applied to the detection of biochemical molecules by terahertz spectroscopy and Raman spectroscopy, but it is not limited to terahertz spectroscopy and Raman spectroscopy.

Thus, the multi-waveband-tunable multi-scale meta-material of the present disclosure has the following beneficial effects.

The multi-waveband-tunable multi-scale meta-material of the present disclosure utilizes the nanoparticle layer to absorb the spectra in the UV and Vis wavebands to generate localized surface plasmon resonance, thereby amplifying the Raman signal of the sample.

The multi-waveband-tunable multi-scale meta-material of the present disclosure utilizes the local electric field induced by the metal layer to amplify the terahertz signal of the sample.

The multi-waveband-tunable multi-scale meta-material of the present disclosure is flexible and has a flat surface, so it can be used for sample detection on curved surfaces.

Compared with traditional spectroscopic techniques, the detection method of the present disclosure utilizes the meta-material to amplify the spectral signal, thus greatly improving the detection sensitivity. Compared with traditional signal amplification methods, the detection method of the present disclosure utilizes the multi-scale meta-material to amplify the spectral signals of different wavebands, thereby expanding the application range of the meta-material. The multi-waveband-tunable multi-scale meta-material is flexible and stretchable and can be tightly attached to curved surfaces. In addition, the detection method of the present disclosure is simple and fast to operate and meets the increasing demand for rapid detection.

Figure 1:
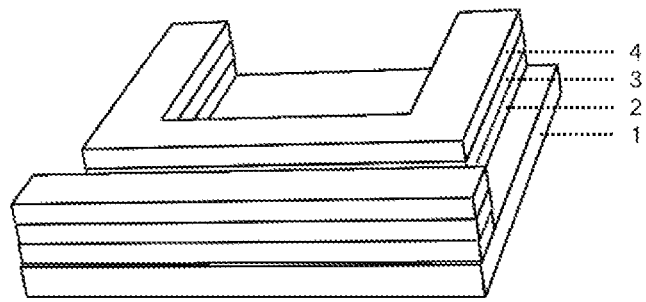
FIG. 1 is a structural view of a multi-waveband-tunable multi-scale meta-material according to the present disclosure.

Reference Numerals: (1) stretchable layer; (2) non-stretchable support layer; (3) metal layer, and (4) nanoparticle layer.

DETAILED DESCRIPTION OF THE EMBODIMENTS

The present disclosure is described in further detail below by referring to embodiments, but the present disclosure is not limited to these embodiments.

EMBODIMENTS

Embodiment 1

(1) Preparation of a Flexible Base

A flat quartz wafer or silicon wafer is ultrasonically cleaned in acetone, ethanol, and water for 5 min respectively, and dried. PDMS is spin-coated and heat-cured on the surface of the quartz or silicon wafer to form a stretchable layer. PI is spin-coated and heat-cured on the surface of the heat-cured PDMS to form a non-stretchable support layer for supporting and protecting a metal layer. 200 nm gold is deposited on the surface of the PI by evaporation of gold in a vacuum to form the metal layer.

(2) Preparation of a Nanoparticle Layer

A 50 nm silver nanocube is synthesized and is filtered three times using a water filter element with a diameter of 0.22 μm. A 0.1 mg/mL solution of polyethylene glycol compound with sulfhydryl groups (PEG-SH) in chloroform is prepared. A silver nanocube solution, the PEG-SH chloroform solution, and a methanol solution are thoroughly mixed at a volume ratio of 1:1:1. The resulting mixture is centrifuged at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-tenth of its original size with the chloroform solution. The resulting mixture is slowly injected onto the surface of an aqueous solution by a syringe at a rate of 0.4 mL/min. Tension at the water surface is monitored by a Langmuir-Blodgett (LB) film analyzer, and a uniform and dense monolayer of the silver nanocube is completely transferred to the surface of the metal layer. The silver nanocube layer serves as the nanoparticle layer to amplify a Raman signal.

(3) Preparation of a Multi-Scale Meta-Material

Figure 2:
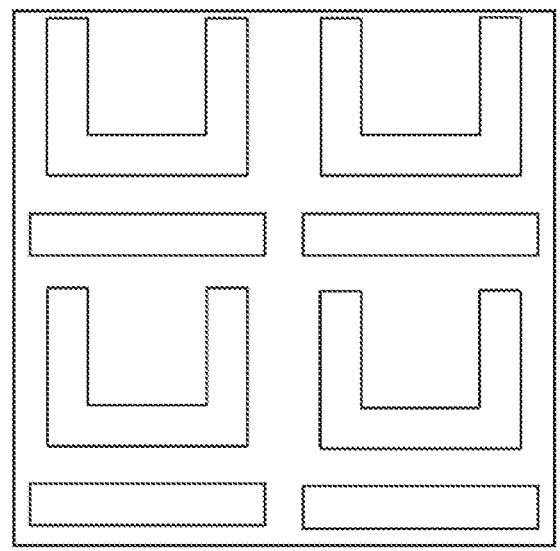
FIG. 2 is a plan view of the multi-waveband-tunable multi-scale meta-material according to the present disclosure.
Figure 3:
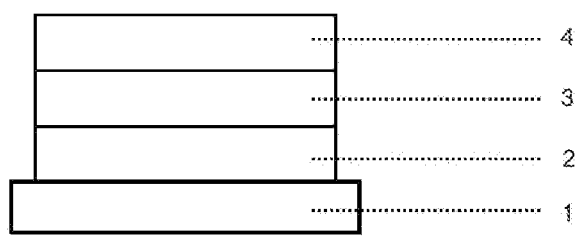
FIG. 3 is a sectional view of the multi-waveband-tunable multi-scale meta-material according to the present disclosure.

The non-stretchable support layer, the metal layer, and the nanoparticle layer are etched into the desired pattern. FIG. 1, FIG. 2, and FIG. 3 shows a structural view, a plan view, and a sectional view of the meta-material, respectively.

(4) Acquisition of a *Pseudomonas aeriginosa* solution and its secretion pyocyanine 1 mL of *Pseudomonas aeruginosa* cultured for 12 h is taken. In this embodiment, $OD_{600}=1$.

(5) Dripping of the *Pseudomonas aeruginosa* Solution onto the Surface of the Meta-Material 10 μL of *Pseudomonas aeruginosa* solution (with pyocyanine) is dripped onto the surface of the multi-scale meta-material and dried at 60° C. The above steps are repeated three times to obtain three sample points to be detected. The detection area of each sample point to be detected is about 20 mm². Three reference sample points (multi-scale meta-material only, not dripped) are also provided.

(6) Acquisition of terahertz time-domain spectra of the sample points to be detected and the reference sample points on the surface of the multi-scale meta-material.

A terahertz time-domain spectrometer and a computer are started. The multi-scale meta-material is put on a sample holder for detection, and a terahertz time-domain system is filled with nitrogen to reduce the internal humidity to less than 0.2% for detection. The terahertz time-domain spectra of the sample points to be detected and the reference sample points on the same multi-scale meta-material in a range of 0.1 THz-2 THz are acquired at the humidity of less than 0.2%. The terahertz time-domain spectrum of each sample point is acquired according to the above method, and a terahertz time-domain spectrum data set of all the sample points is acquired. A terahertz time-domain signal of the sample point is converted into a terahertz frequency-domain signal through a fast Fourier transform, and a reflectivity and transmittance of the sample point to be detected are acquired through the terahertz frequency-domain signal. A frequency corresponding to a maximum value of a resonance peak is calculated based on the reflectivity and transmittance, and a frequency of a resonance peak of the sample point to be detected is subtracted from a frequency of a resonance peak of the reference sample point to obtain a change in the frequency of the resonance peak.

Figure 4:
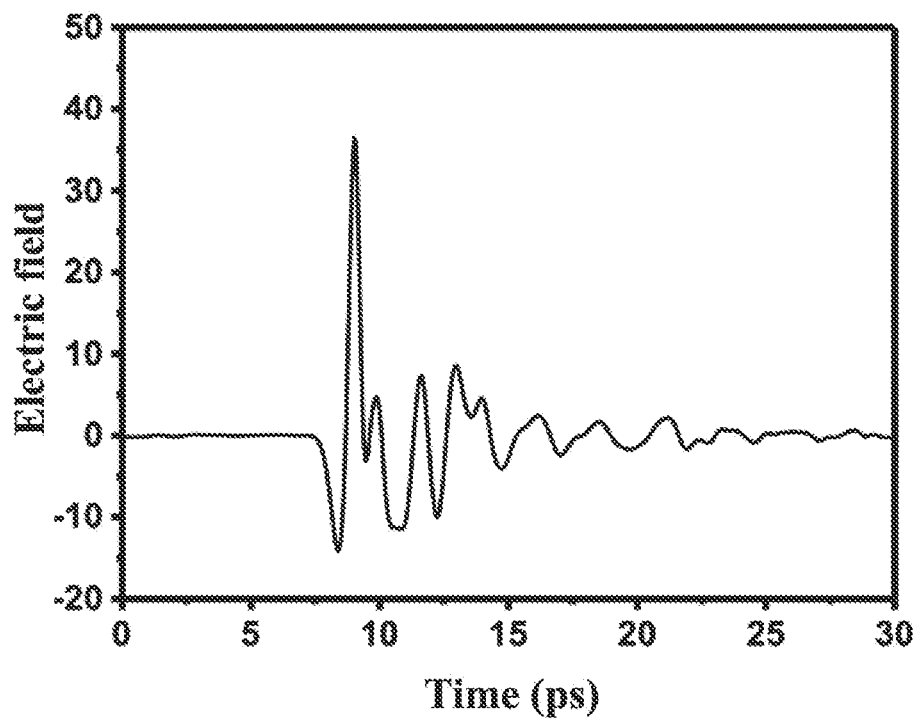
FIG. 4 shows the transmittance of an experimental terahertz time-domain signal of the multi-waveband-tunable multi-scale meta-material according to the present disclosure.
Figure 5:
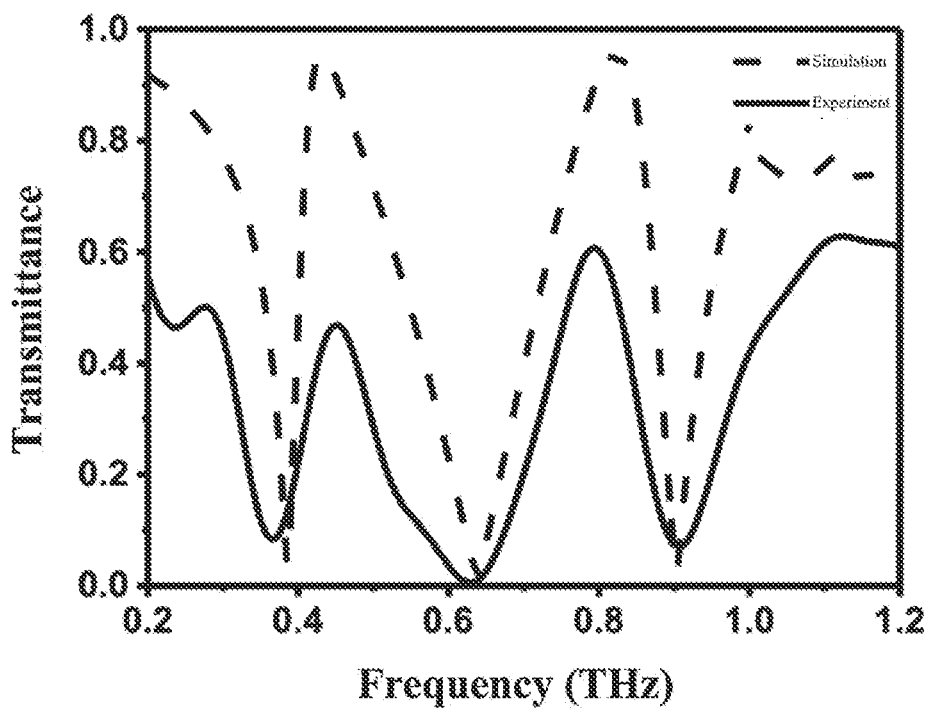
FIG. 5 shows the transmittance of simulated and experimental terahertz frequency-domain signals of the multi-waveband-tunable multi-scale meta-material according to the present disclosure.
Figure 6:
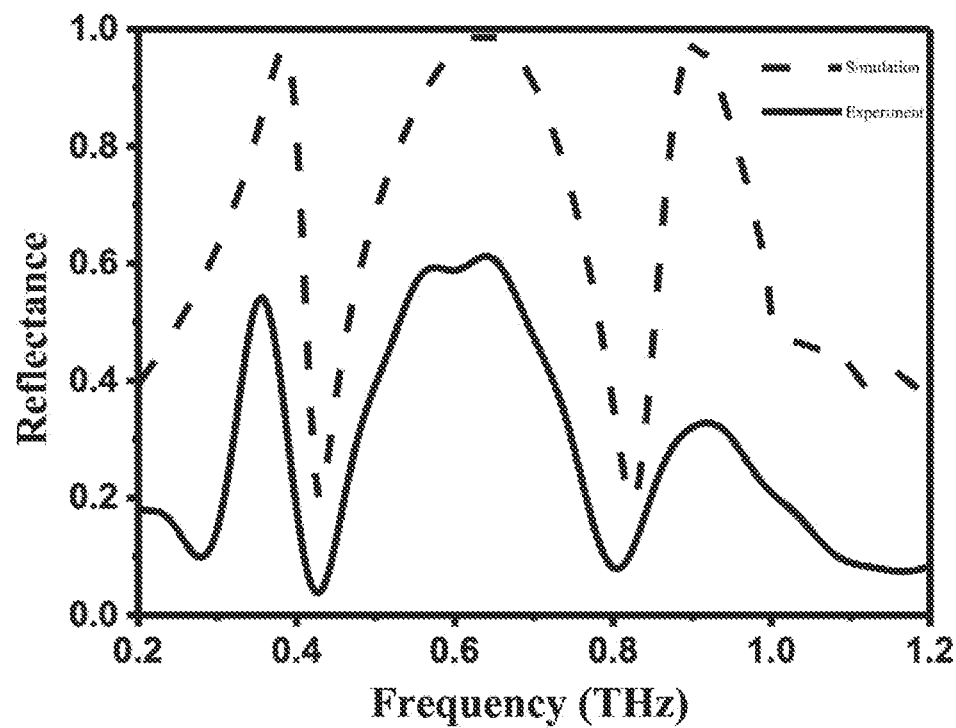
FIG. 6 shows the of the simulated and experimental terahertz frequency-domain signals of the multi-waveband-tunable multi-scale meta-material according to the present disclosure.
Figure 7:
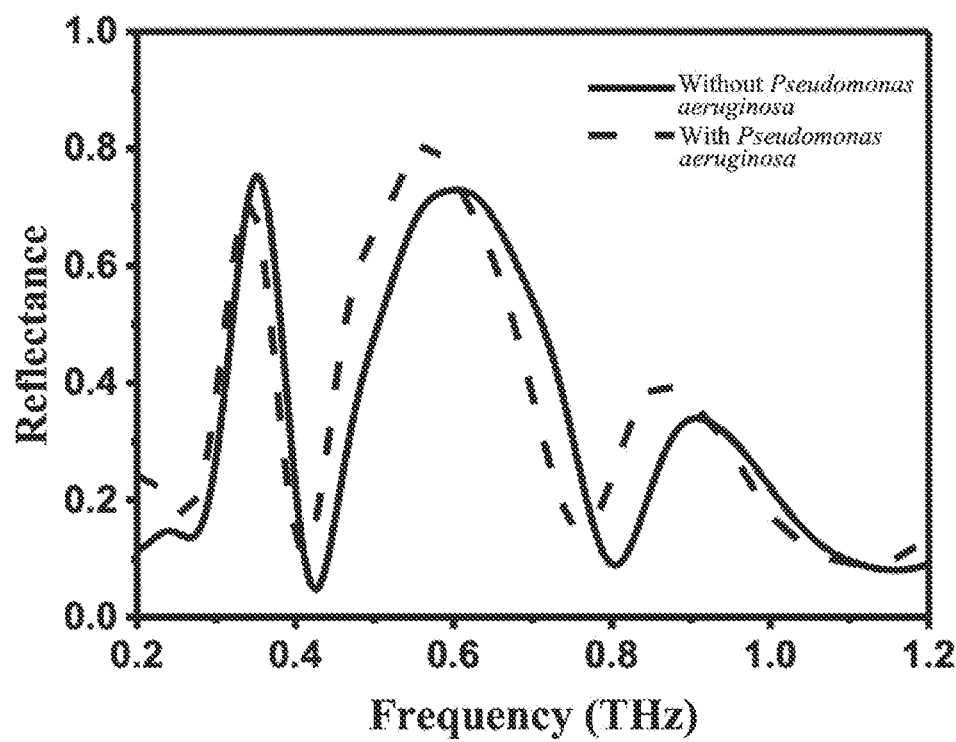
FIG. 7 shows the reflectivity of the simulated and experimental terahertz frequency-domain signals of the multi-waveband-tunable multi-scale meta-material in the presence and absence of *Pseudomonas aeruginosa* according to Embodiment 1 of the present disclosure.

FIG. 4 shows the transmittance of an experimental terahertz time-domain signal of the multi-waveband-tunable multi-scale meta-material. FIG. 5 shows the transmittance of simulated and experimental terahertz frequency-domain signals of the multi-waveband-tunable multi-scale meta-material. FIG. 6 shows the reflectivity of the simulated and experimental terahertz frequency-domain signals of the multi-waveband-tunable multi-scale meta-material. FIG. 7 shows the reflectivity of the simulated and experimental terahertz frequency-domain signals of the multi-waveband-tunable multi-scale meta-material in the presence and absence of *Pseudomonas aeruginosa*.

(7) Acquisition of Raman spectral signals of the pyocyanine on the surface of the multi-waveband-tunable multi-scale meta-material.

Figure 8:
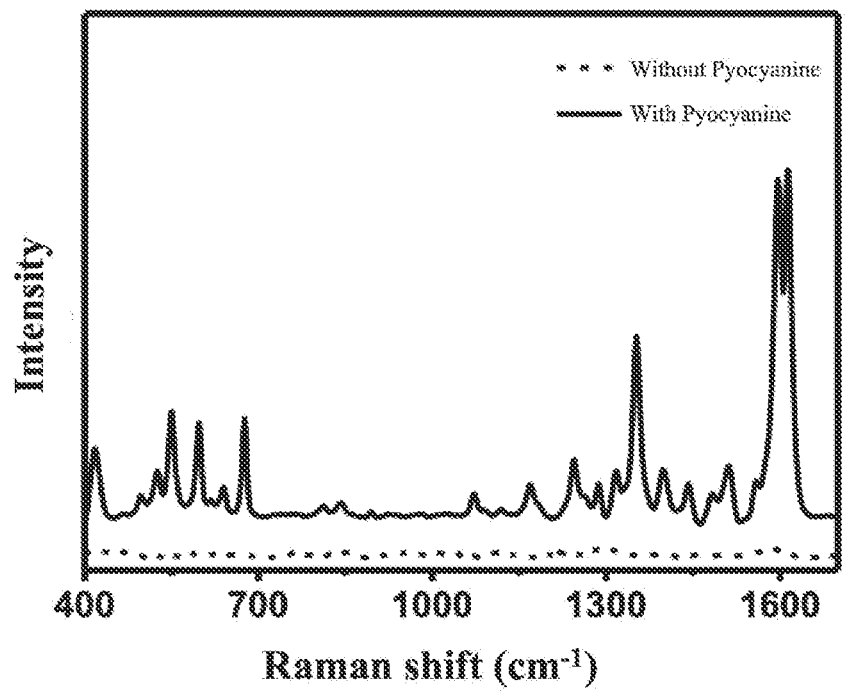
FIG. 8 shows the Raman spectra of the multi-waveband-tunable multi-scale meta-material according to Embodiment 1 of the present disclosure.

The pyocyanine is dripped onto the multi-waveband-tunable multi-scale meta-material. Laser intensity is adjusted, the sample is adjusted to a horizontal state, and the Raman spectra of the sample points to be detected on the multi-waveband-tunable multi-scale meta-material are acquired. The Raman spectra of the multi-waveband-tunable multi-scale meta-material in the presence and absence of the pyocyanine are shown in FIG. 8.

Embodiment 2

(1) Preparation of a Flexible Base

A flat PI film is ultrasonically cleaned in ethanol and water for 5 min respectively, and dried. The PI is attached to PDMS, such that PDMS forms a stretchable layer, and PI forms a non-stretchable support layer for supporting and protecting a metal layer. 200 nm gold is deposited on the surface of the PI film by evaporation of gold in a vacuum to form the metal layer.

(2) Preparation of a Nanoparticle Layer

A 50 nm silver nanocube is synthesized and is filtered three times using a water filter element with a diameter of 0.22 μm. A 0.1 mg/mL solution of polyethylene glycol compound with sulfhydryl groups (PEG-SH) in chloroform is prepared. A silver nanocube solution, the PEG-SH chloroform solution, and a methanol solution are thoroughly mixed at a volume ratio of 1:1:1. The resulting mixture is centrifuged at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-tenth of its original size with the chloroform solution. The resulting mixture is slowly injected onto a surface of an aqueous solution by a syringe at a rate of 0.4 mL/min. Tension at the water surface is monitored by a Langmuir-Blodgett (LB) film analyzer, and a uniform and dense monolayer of the silver nanocube is completely transferred to the surface of the metal layer. The silver nanocube layer serves as the nanoparticle layer to amplify a Raman signal.

(3) Preparation of a Multi-Scale Meta-Material

The non-stretchable support layer, the metal layer, and the nanoparticle layer are etched into the desired pattern. FIG. 1, FIG. 2, and FIG. 3 shows a structural view, a plan view, and a sectional view of the meta-material, respectively.

(4) Acquisition of a *Pseudoronas aeruginosa* Solution and its Secretion Pyocyanine 1 mL of *Pseudoronas aeruginosa* cultured for 12 h is taken. In this embodiment, $OD_{600}=1$.

(5) Dripping of the *Pseudoronas aeruginosa* Solution onto the Surface of the Meta-Material 10 mL of *Pseudomonas aeruginosa* solution (with pyocyanine) is dripped onto the surface of the multi-scale meta-material and dried at 60° C. The above steps are repeated three times to obtain three sample points to be detected. The detection area of each sample point to be detected is about 25 mm$^2$. Three reference sample points (multi-scale meta-material only, not dripped) are also provided.

(6) Acquisition of terahertz time-domain spectra of the sample points to be detected and the reference sample points on the surface of the multi-waveband-tunable multi-scale meta-material.

A terahertz time-domain spectrometer and a computer are started. The multi-waveband-tunable multi-scale meta-material is put on a sample holder for detection, and a terahertz time-domain system is filled with nitrogen to reduce the internal humidity to less than 0.2% for detection. The terahertz time-domain spectra of the sample points to be detected and the reference sample points on the same multi-scale meta-material in a range of 0.1 THz-2 THz are acquired at the humidity of less than 0.2%. The terahertz time-domain spectrum of each sample point is acquired according to the above method, and a terahertz time-domain spectrum data set of all the sample points is acquired. A terahertz time-domain signal of the sample point is converted into a terahertz frequency-domain signal through a fast Fourier transform, and a reflectivity and transmittance of the sample point to be detected are acquired through the terahertz frequency-domain signal. A frequency corresponding to a maximum value of a resonance peak is calculated based on the reflectivity and transmittance, and a frequency of a resonance peak of the sample point to be detected is subtracted from a frequency of a resonance peak of the reference sample point to obtain a change in the frequency of the resonance peak.

Figure 9:
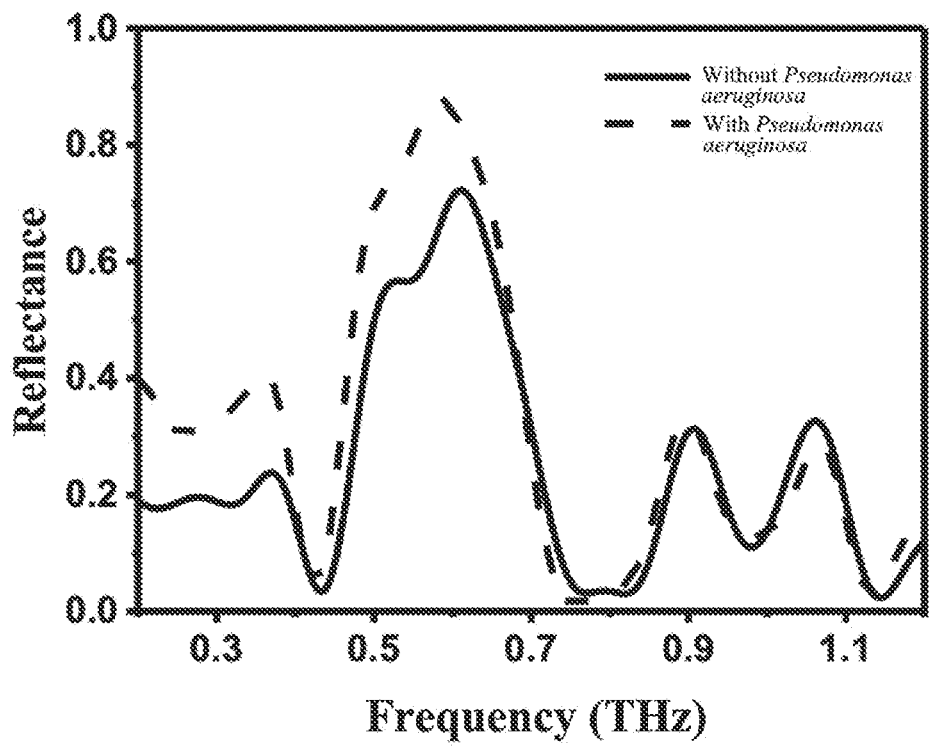
FIG. 9 shows the reflectivity of the simulated and experimental terahertz frequency-domain signals of the multi-waveband-tunable multi-scale meta-material according to Embodiment 2 of the present disclosure.

FIG. 9 shows a reflectivity of a terahertz frequency-domain signal of the multi-waveband-tunable multi-scale meta-material in the presence and absence of *Pseudomonas aeruginosa*.

Embodiment 3

(1) Preparation of a Stretchable Layer

A flat quartz wafer or silicon wafer is ultrasonically cleaned in acetone, ethanol, and water for 5 min and dried. PDMS is spin-coated on the surface of the quartz or silicon wafer and cured at 80° C. for 30 min to form the stretchable layer.

(2) Preparation of a Non-Stretchable Support Layer

PI is spin-coated on the surface of the stretchable layer and cured at 200° C. for 1 h to form the non-stretchable support layer for supporting and protecting a metal layer.

(3) Preparation of the Metal Layer 200 nm gold is deposited on the surface of the non-stretchable support layer (PI) by evaporation of gold in a vacuum to form the metal layer. A piece of sample is directly used to make a meta-material without a nanoparticle layer (step 5), and another piece of sample is used to make a meta-material with the nanoparticle layer (step 4).

(4) Preparation of a Nanoparticle Layer

A 50 nm silver nanocube is synthesized and filtered three times using a water filter element with a diameter of 0.22 μm. A 0.1 mg/mL solution of polyethylene glycol compound with sulfhydryl groups (PEG-SH) in chloroform is prepared. A silver nanocube solution, the PEG-SH chloroform solution, and a methanol solution are thoroughly mixed at a volume ratio of 1:1:1. A resulting mixture is centrifuged at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-tenth of its original size with the chloroform solution. The resulting mixture is slowly injected onto a surface of an aqueous solution by a syringe at a rate of 0.4 mL/min. Tension at the water surface is monitored by a Langmuir-Blodgett (LB) film analyzer, and a uniform and dense monolayer of the silver nanocube is completely transferred to the surface of the metal layer. The silver nanocube layer serves as the nanoparticle layer to amplify a Raman signal.

(5) Preparation of a Multi-Scale Meta-Material

The non-stretchable support layer, the metal layer, and the nanoparticle layer are etched into the desired pattern. FIG. 1, FIG. 2, and FIG. 3 shows a structural view, a plan view, and a sectional view of the meta-material, respectively.

(6) Acquisition of Terahertz Time-Domain Spectra of the Multi-Waveband-Tunable Multi-Scale Meta-Material.

A terahertz time-domain spectrometer and a computer are started. The multi-waveband-tunable multi-scale meta-material is put on a sample holder for detection, and a terahertz time-domain system is filled with nitrogen to reduce the internal humidity to less than 0.2% for detection. The terahertz time-domain spectra of the sample points to be detected and the reference sample points on the multi-scale meta-material in a range of 0.1 THz-2 THz are acquired at the humidity of less than 0.2%. The terahertz time-domain spectrum of each sample point is acquired according to the above method, and a terahertz time-domain spectrum data set of all the sample points is acquired. A terahertz time-domain signal of the sample point is converted into a terahertz frequency-domain signal through a fast Fourier transform, and a reflectivity and transmittance of the sample point to be detected are acquired through the terahertz frequency-domain signal. The position of a resonance peak is calculated based on reflectivity and transmittance.

Figure 10:
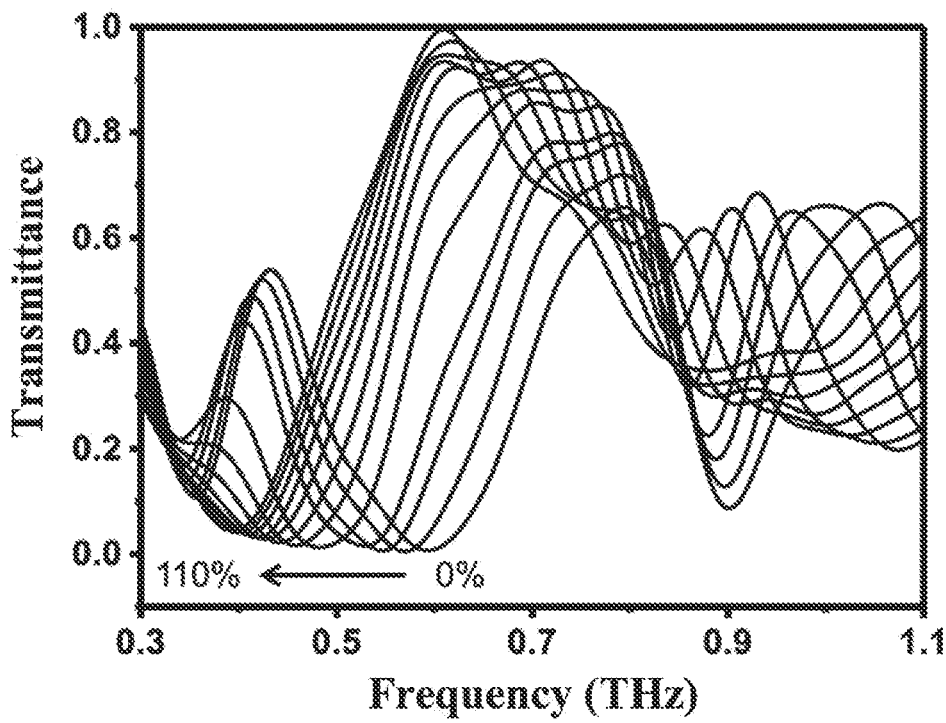
FIG. 10 shows the transmittance of the terahertz frequency-domain signal of the multi-waveband-tunable multi-scale meta-material at different elongations according to Embodiment 3 of the present disclosure.

(7) Tuning of the Terahertz Spectrum by Stretching the Multi-Scale Meta-Material The multi-scale meta-material is fixed on a uniaxial stretching stage and is stretched along a U-shaped opening with an elongation of 0-1100%, 10% of the original length is stretched each time, and terahertz time-domain signals are acquired at three points after each stretch. FIG. 10 shows the transmittance of the terahertz frequency-domain signal of the multi-waveband-tunable multi-scale meta-material at different elongations. The pattern of the meta-material changes during stretching, which leads to the tuning of the terahertz spectrum (shift of the resonance peak).

Embodiment 4

(1) Preparation of a Stretchable Layer

A flat quartz wafer or silicon wafer is ultrasonically cleaned in acetone, ethanol, and water for 5 min and dried. PDMS is spin-coated on the surface of the quartz or silicon wafer and cured at 80° C. for 30 min to form the stretchable layer.

(2) Preparation of a Non-Stretchable Support Layer

PI is spin-coated on the surface of the stretchable layer and cured at 200° C. for 1 h to form the non-stretchable support layer for supporting and protecting a metal layer.

(3) Preparation of the Metal Layer 200 nm gold is deposited on the surface of the non-stretchable support layer (PI) by evaporation of gold in a vacuum to form the metal layer. A piece of sample is directly used to make a meta-material without a nanoparticle layer (step 5), and another piece of sample is used to make a meta-material with the nanoparticle layer (step 4).

(4) Preparation of a Nanoparticle Layer

A 50 nm silver nanocube is synthesized and filtered three times by a water filter element with a diameter of 0.22 μm. A 0.1 mg/mL solution of polyethylene glycol compound with sulfhydryl groups (PEG-SH) in chloroform is prepared. A silver nanocube solution, the PEG-SH chloroform solution, and a methanol solution are thoroughly mixed at a volume ratio of 1.1:1. The resulting mixture is centrifuged at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-tenth of its original size with the chloroform solution. The resulting mixture is slowly injected onto a surface of an aqueous solution by a syringe at a rate of 0.4 mL/min. Tension at the water surface is monitored by a Langmuir-Blodgett (LB) film analyzer, and a uniform and dense monolayer of the silver nanocube is completely transferred to the metal layer/non-stretchable support layer. The silver nanocube layer serves as the nanoparticle layer to amplify a Raman signal.

(5) Preparation of the Meta-Material with or without the Metal Layer

The non-stretchable support layer, the metal layer, and the nanoparticle layer are etched into the desired pattern to form the meta-material with the nanoparticle layer. The non-stretchable support layer and the metal layer are etched into the desired pattern to form the meta-material without the nanoparticle layer. FIG. 2 shows the plan view of the meta-material with/without the nanoparticle layer.

(6) Acquisition of a *Pseudomonas aeruginosa* Solution and its Secretion Pyocyanine 1 mL of *Pseudomonas aeruginosa* cultured for 12 h is taken. In this embodiment, $OD_{600}=1$.

(7) Dripping of the *Pseudomonas aeruginosa* Solution onto the Surface of the Meta-Material 10 μL of *Pseudomonas aeruginosa* solution (with pyocyanine) is dripped onto the surface of the meta-material with or without the nanoparticle layer and dried at 60° C. The above steps are repeated three times to obtain three sample points to be detected. The detection area of each sample point to be detected is about 20 $mm^2$.

(8) Acquisition of Raman Spectral Signals of the Pyocyanine on the Surface of the Meta-Material.

Figure 11:
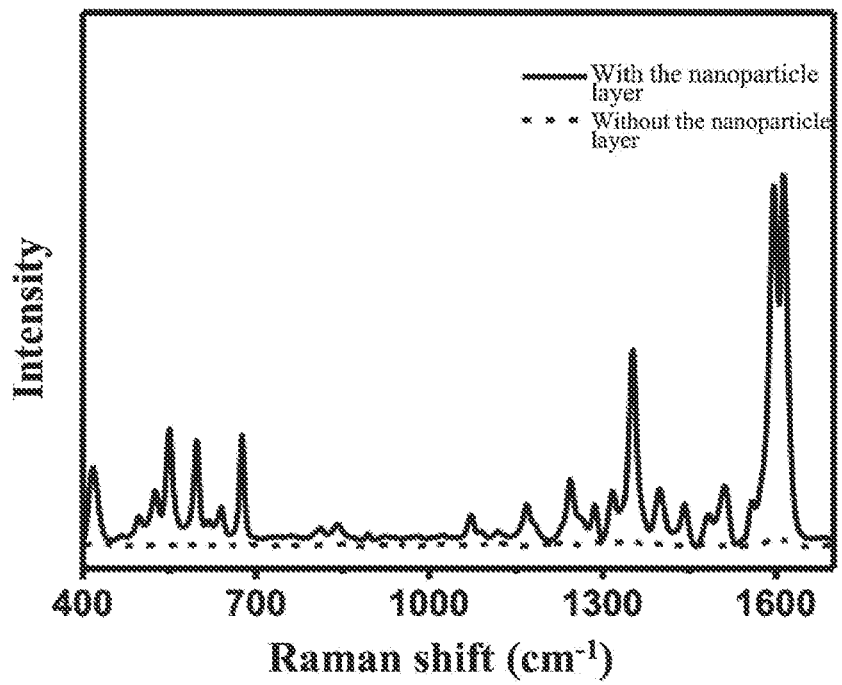
FIG. 11 shows the Raman spectra of the multi-waveband-tunable multi-scale meta-material (with or without a nanoparticle layer) in the presence of *Pseudomonas aeruginosa* according to Embodiment 4 of the present disclosure.

The *Pseudomonas aeruginosa* solution (with pyocyanine) is dripped onto the meta-material, and the meta-material is put on a sample stage of a Raman spectrometer. Laser intensity is adjusted, and the sample is adjusted to a horizontal state. The Raman spectra of the sample points to be detected on the meta-material without or without the nanoparticle layer are acquired respectively. FIG. 11 shows the Raman spectra of the meta-material with or without the nanoparticle layer in the presence of *Pseudomonas aeruginosa*. It can be seen from the figure that the signal of the pyocyanine on the meta-material with the nanoparticle layer is much stronger than that on the meta-material without the nanoparticle layer.

Embodiment 5

(1) Preparation of a Stretchable Layer

A flat quartz wafer or silicon wafer is ultrasonically cleaned in acetone, ethanol, and water for 5 min and dried. PDMS is spin-coated on the surface of the quartz or silicon wafer and cured at 80° C. for 30 min to form the stretchable layer.

(2) Preparation of a Non-Stretchable Support Layer

PI is spin-coated on the surface of the stretchable layer and cured at 200° C. for 1 h to form the non-stretchable support layer for supporting and protecting a metal layer. A piece of sample is directly used to make a meta-material without a metal layer (step 4), and another piece of sample is used to make a meta-material with the metal layer (step 3).

(3) Preparation of the Metal Layer 200 nm gold is deposited on the surface of the non-stretchable support layer (PI) by evaporation of gold in a vacuum to form the metal layer.

(4) Preparation of a Nanoparticle Layer

A 50 nm silver nanocube is synthesized and filtered three times by a water filter element with a diameter of 0.22 μm. A 0.1 mg/mL solution of polyethylene glycol compound with sulfhydryl groups (PEG-SH) in chloroform is prepared. A silver nanocube solution, the PEG-SH chloroform solution, and a methanol solution are thoroughly mixed at a volume ratio of 1:1:1. The resulting mixture is centrifuged at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-third of its original size with the chloroform solution. Centrifuging is performed at 8,000 rpm for 15 min. A supernatant is discarded, and a precipitate is re-dissolved to one-tenth of its original size with the chloroform solution. The resulting mixture is slowly injected onto a surface of an aqueous solution by a syringe at a rate of 0.4 mL/min. Tension at the water surface is monitored by a Langmuir-Blodgett (LB) film analyzer, and a uniform and dense monolayer of the silver nanocube is completely transferred to the metal layer/non-stretchable support layer. The silver nanocube layer serves as the nanoparticle layer to amplify a Raman signal.

(5) Preparation of the Meta-Material with or without the Metal Layer

The non-stretchable support layer, the metal layer, and the nanoparticle layer are etched into the desired pattern to form the meta-material with the metal layer. The non-stretchable support layer and the nanoparticle layer are etched into the desired pattern to form the meta-material without the metal layer. FIG. 2 shows the plan view of the meta-material with/without the metal layer.

(6) Acquisition of Terahertz Time-Domain Spectra of the Sample Points to be Detected on the Surface of the Meta-Material with or without the Metal Layer.

Figure 12:
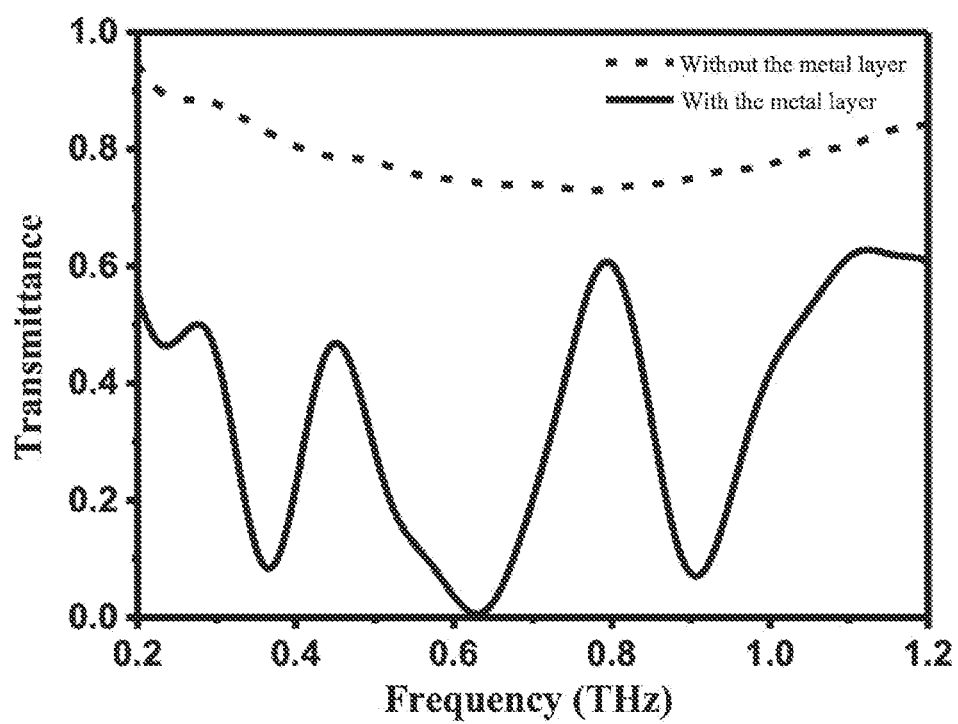
FIG. 12 shows the transmittance of the terahertz frequency-domain signal of the multi-waveband-tunable multi-scale meta-material with or without a metal layer according to Embodiment 5 of the present disclosure.

A terahertz time-domain spectrometer and a computer are started. The meta-material is put on a sample holder for detection, and a terahertz time-domain system is filled with nitrogen to reduce the internal humidity to less than 0.2% for detection. The terahertz time-domain spectra of the sample points to be detected on the meta-material in a range of 0.1 THz-2 THz are acquired at a humidity of less than 0.2%. A terahertz time-domain spectrum data set of all the sample points is acquired. A terahertz time-domain signal of the meta-material is converted into a terahertz frequency-domain signal through a fast Fourier transform, and a reflectivity and transmittance of the sample point to be detected are acquired through the terahertz frequency-domain signal. FIG. 12 shows the transmittance of the terahertz frequency-domain signal of the meta-material with or without the metal layer. It can be seen from the figure that the resonance peak only appears in the terahertz frequency-domain signal of the meta-material with the metal layer.

In conclusion, in the multi-waveband-tunable multi-scale meta-material of the present disclosure, the metal layer is on the micrometer scale, and the nanoparticle layer is on the nanometer scale. The microstructure of the metal layer enables the meta-material to amplify the terahertz spectral signal, and the nanostructure of the nanoparticle layer enables the meta-material to amplify the Raman spectral signal, thereby realizing both terahertz and Raman spectral detection. The detection method of the present disclosure is sensitive, simple, and fast to operate, and satisfies the increasing demand for rapid detection. The meta-material of the present disclosure is flexible and stretchable, can be closely attached to various samples, and realizes the function of spectral tuning by stretching.

The above specific implementations are intended to explain the present disclosure, rather than to limit the present disclosure. Any modification and change to the present disclosure within the spirit of the present disclosure and the protection scope of the claims should fall into the protection scope of the present disclosure.

What is claimed is:

1. A multi-waveband-tunable multi-scale meta-material, comprising:
    a stretchable layer, a non-stretchable support layer, a metal layer, and a nanoparticle layer sequentially stacked from bottom to top, wherein the stretchable layer is a polydimethylsiloxane (PDMS) layer; the non-stretchable support layer is a polyimide (PI) layer; the metal layer is a gold layer; and the nanoparticle layer is modified with a hydrophobic group.

2. The multi-waveband-tunable multi-scale meta-material according to claim 1, wherein
    nanoparticles are self-assembled on the metal layer to form the nanoparticle layer.

3. The multi-waveband-tunable multi-scale meta-material according to claim 1, wherein
    multiple basic units are arranged in an array at intervals on the stretchable layer; and each of the multiple basic units comprises the non-stretchable support layer, the metal layer, and the nanoparticle layer sequentially stacked from bottom to top.

4. A preparation method of the multi-waveband-tunable multi-scale meta-material according to claim 1, comprising the following steps:
  1) preparing the stretchable layer:
  depositing a layer of fluorosilane molecules on a surface of a cleaned silicon wafer by a vacuum evaporation; and spin-coating a layer of a PDMS and heat-curing the layer of the PDMS to form the stretchable layer;
  2) preparing the non-stretchable support layer:
  subjecting the stretchable layer to a plasma cleaning, spin-coating a layer of PI, and curing the layer of the PI at 200° C. for 2 h to form the non-stretchable support layer;
  3) preparing the metal layer:
  sputtering gold with a thickness of 200 nm on a surface of the layer of the PI to form the metal layer;
  4) preparing the nanoparticle layer:
  modifying nanoparticles with the hydrophobic group, self-assembling the nanoparticles modified with the hydrophobic group on a water surface to form the nanoparticle layer, and transferring the nanoparticle layer to the metal layer to form the nanoparticle layer; and
  5) etching a pattern of a meta-material:
  etching the non-stretchable support layer, the metal layer, and the nanoparticle layer according to a preset pattern and removing the stretchable layer from the cleaned silicon wafer and the layer of the fluorosilane molecules.

5. The preparation method of the multi-waveband-tunable multi-scale meta-material according to claim 4, wherein the nanoparticles of the nanoparticle layer is self-assembled on the water surface, a size of the nanoparticles is 10 nm-80 nm, and a structure of the nanoparticles is a silver-coated gold structure.

6. The preparation method of the multi-waveband-tunable multi-scale meta-material according to claim 4, wherein the PDMS of the stretchable layer has a thickness of 10 μm-200 μm; and the PI of the non-stretchable support layer has a thickness of 1 μm-10 μm.

7. The preparation method of the multi-waveband-tunable multi-scale meta-material according to claim 4, wherein the preset pattern is formed by multiple basic units arranged in an array at intervals; and each of the multiple basic units comprises the non-stretchable support layer, the metal layer, and the nanoparticle layer sequentially stacked from bottom to top.

8. A spectral detection method using the multi-waveband-tunable multi-scale meta-material according to claim 1, comprising the following steps:
  S1: dripping a sample solution onto the multi-waveband-tunable multi-scale meta-material:
  preparing and dripping the sample solution onto the multi-waveband-tunable multi-scale meta-material and conducting a drying at 50° C. to form a sample to be detected; and
  taking the multi-waveband-tunable multi-scale meta-material without being dripped with the sample solution as a reference sample;
  S2: performing a terahertz spectral detection in a second waveband:
  acquiring terahertz time-domain signals of the sample to be detected and the reference sample at a humidity of less than 0.2 RH separately, calculating terahertz frequency-domain signals based on the terahertz time-domain signals, determining locations of resonance peaks based on the terahertz frequency-domain signals, and taking a difference between a frequency of a resonance peak of the sample to be detected and a frequency of g resonance peak of the reference sample as a detection signal; and
  S3: performing a Raman spectral detection in a first waveband:
  putting the sample to be detected on a sample stage of a Raman spectrometer; focusing, by a confocal microscope, the sample to be detected; and randomly selecting three points in a detection range of 400 $cm^{-1}$-1,800 $cm^{-1}$ for the Raman spectral detection.

9. The spectral detection method using the multi-waveband-tunable multi-scale meta-material according to claim 8, wherein in the S1, 10 μL of the sample solution is dripped each time, and the drying is performed at 40° C.-60° C.

* * * * *